United States Patent [19]
Ohnishi et al.

[11] Patent Number: 6,125,087
[45] Date of Patent: *Sep. 26, 2000

[54] OPTICAL PICKUP FOR OPTICAL DISK APPARATUS

[75] Inventors: Kunikazu Ohnishi, Yokosuka; Masayuki Inoue; Tohru Sasaki, both of Yokohama; Yukio Fukui, Setagaya-ku; Takeshi Nakao, Sagamihara; Takeshi Shimano, Tokorozawa, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/965,448

[22] Filed: Nov. 6, 1997

[30] Foreign Application Priority Data

Nov. 7, 1996 [JP] Japan ................................... 8-294822
Nov. 12, 1996 [JP] Japan ................................... 8-300036

[51] Int. Cl.$^7$ ..................................................... G11B 7/09
[52] U.S. Cl. .................................. 369/44.23; 369/44.41; 369/112; 369/44.29
[58] Field of Search ............................. 369/44.14, 44.23, 369/44.41, 103, 109, 112, 44.37, 44.12, 58, 54, 44.29

[56] References Cited

U.S. PATENT DOCUMENTS

| | | | |
|---|---|---|---|
| 5,570,333 | 10/1996 | Katayama | 369/109 |
| 5,737,296 | 4/1998 | Komma et al. | 369/109 |
| 5,757,754 | 5/1998 | Yamamoto et al. | 369/112 |
| 5,859,819 | 1/1999 | Miyabe et al. | 369/44.41 |

FOREIGN PATENT DOCUMENTS

| | | |
|---|---|---|
| 1-98131 | 4/1989 | Japan . |
| 8-77578 | 3/1996 | Japan . |

*Primary Examiner*—Thang V. Tran
*Attorney, Agent, or Firm*—Evenson, McKeown, Edwards & Lenahan, P.L.L.C.

[57] ABSTRACT

Disclosed is an optical pickup and an optical disc device using the same, each including a laser diode, a photo-detector having a region divided into at least six photo-detection areas, and a diffraction grating disposed between the laser diode and the photo-detector and having a region divided into four areas by cross-shaped division lines. The diffraction grating divides a light beam reflected from an optical disc into four diffracted light beams. A focus error signal in accordance with a knife edge method and two kinds of tracking error signals in accordance with a push-pull method and a differential phase detection method are detected by irradiating the light beams diffracted at the areas of the diffraction grating on the detection areas of the photo-detector and/or at boundary lines therebetween, and arithmetically operating light intensity signals obtained from the detection areas of the photo-detector. As a result, there can be realized an optical pickup and an optical disc device, each of which can be matched with various optical discs different in structure by detecting a tracking error signal in accordance with the push-pull method and a tracking error signal suitable for a read only disc using only one photo-detector. Further, in the present invention, a holographic element can be used as the diffraction grating.

6 Claims, 13 Drawing Sheets

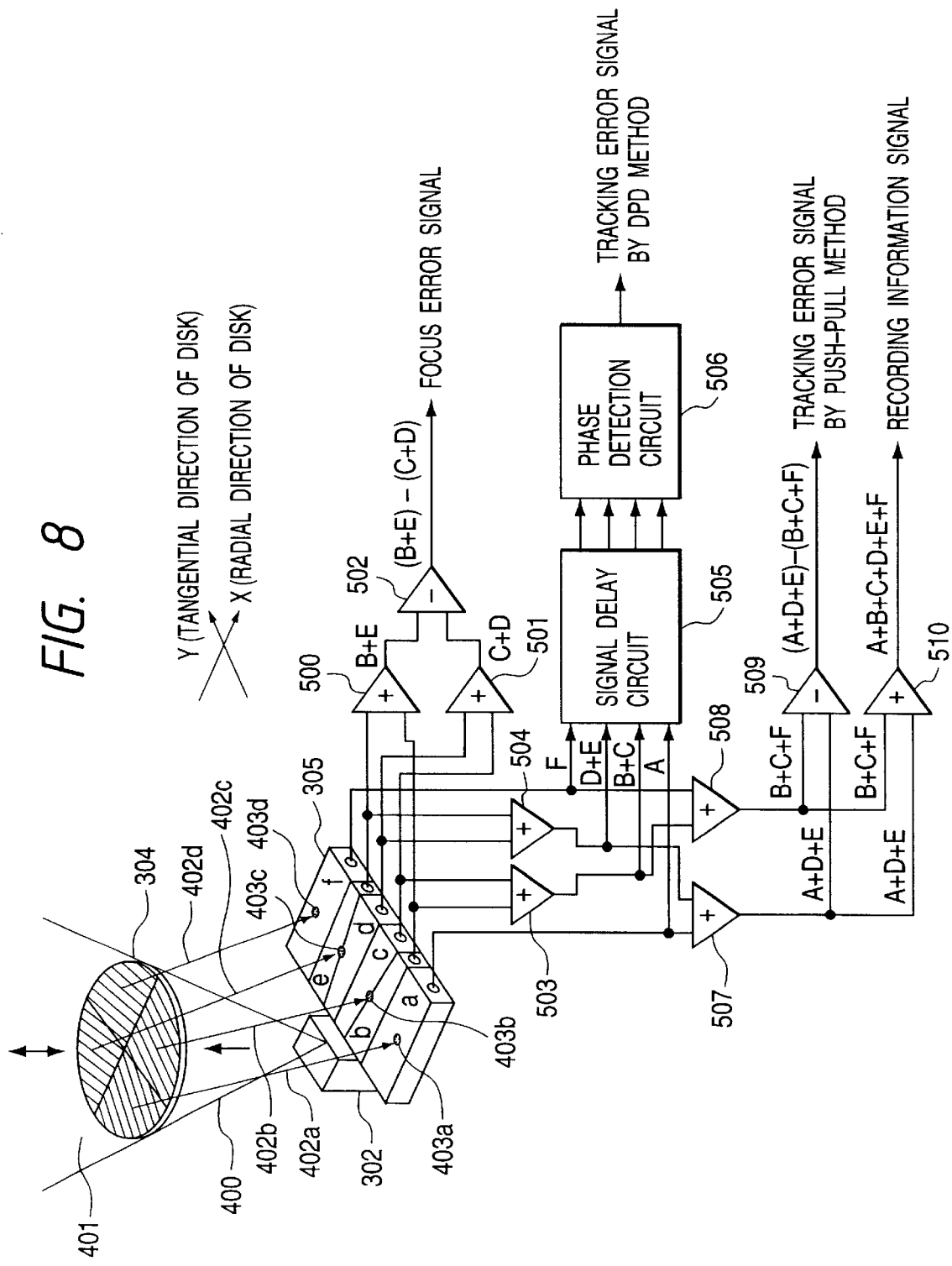

OPTICAL PICKUP FOR OPTICAL DISK APPARATUS

BACKGROUND OF THE INVENTION

1. Field of the Invention

The present invention relates to an optical pickup suitable for recording an information signal on an optical storage medium (hereinafter, referred to simply to "an optical disc") or reproducing a recorded information signal therefrom, and an optical disc device using the same.

2. Description of the Related Art

In recent years, various optical pickups have been disclosed of a type adopting a diffraction grating, particularly, a holographic element for a detecting system, as a means effective to miniaturize and simply the optical pickup. For example, an optical pickup described in Japanese Patent Laid-open No Hei 8-77578 includes a holographic element disposed between an objective lens and a laser diode, and a four-division type photo-detector disposed in the vicinity of the laser diode, whereby a focus error signal is detected by a so-called spot size detection method and a tracking error signal is detected by a so-called push-pull method.

An optical pickup described in Japanese Patent Laid-open No. Hei 1-98131 includes a two-division type holographic element disposed between an objective lens and a laser diode, and a four-division type photo-detector disposed in the vicinity of the laser diode, whereby a focus error signal is detected by a so-called double knife edge method. In this related art document, there is also disclosed a photo-detector in which a division line of the photo-detector is tilted with respect to the diffraction direction of a reflected light of a diffraction element in order that light quantities of convergent light spots on optical detection areas on both sides of the division line are substantially equal to each other even if the convergent light spots on the photo-detector are displaced due to a variation in wavelength of a laser beam.

Optical discs generally used at present are mainly classified into two types from the viewpoint of the structure. One type is a so-called rewritable disc which allows an information signal to be recorded or erased along a continuous guide groove previously provided in an information recording plane of the optical disc. Another type is a so-called read only optical disc which only allows an information signal to be reproduced from irregular pit rows previously formed on the optical disc in accordance with information signals. Further, there are known optical discs of a type in which a rewritable area and a read only area are provided in one optical disc. In these circumstances, it is desired that the same optical disc device can freely, not exclusively, perform recording or reproducing for a plurality of kinds of optical discs different in disc structure.

However, in general, the push-pull method which is a tracking error signal detecting method most suitable for a rewritable disc having a guide groove is not suitable for a read only disc having no continuous guide groove, and reversely, a three-spot method which is most common as a tracking error signal detecting method for a read only disc cannot be applied to a rewritable disc. In other words, to perform recording or reproducing for a rewritable disc and a read only disc, there are required different tracking error signal detectors suitable for respective structures of the optical discs.

With respect to such a problem, there has been generally used an optical pickup capable of detecting only one of tracking error signals in accordance with a tracking error signal detecting method specialized for a rewritable disc using the push-pull method and a tracking error signal detecting method specialized for a read only disc, and there has been not known any optical pickup capable of detecting a plurality of kinds of tracking error signals by the same optical pickup.

An object of the present invention is to provide an optical pickup capable of including a tracking error signal detector specialized for a rewritable disc and a tracking error signal detector suitable for a read only disc by making use of a diffraction grating.

Another object of the present invention is to provide an optical pickup capable of reducing the size and simplifying the structure by making use of a diffraction grating.

A further object of the present invention is to provide an optical pickup capable of including a tracking error signal detector specialized for a rewritable disc and a tracking error signal detector specialized for a read only disc, and also enhancing a light availability by using a holographic element as a diffraction grating.

SUMMARY OF THE INVENTION

An optical pickup of the present invention includes a light source for emitting a light beam; an objective lens for condensing the light beam emitted from the light source, and irradiating the light beam on an optical storage medium; a photo-detector having a plurality of independent detection areas; and a diffraction grating provided in an optical path between the objective lens and the photo-detector, the diffraction grating having substantially cross-shaped division lines; wherein the diffraction grating has a region divided, by the substantially cross-shaped division lines, into four areas different in direction of diffraction of the light beam; the plurality of independent detection areas of the photo-detector comprise: first and second detection areas whose boundaries are in close proximity to each other; third and fourth detection areas whose boundaries are in close proximity to each other; and at least, a fifth detection area independent from the first to fourth areas and a sixth detection area independent from the first to fifth areas; and light intensities of the light beams diffracted at the areas of the diffraction grating are independently detected by the detection areas of the photo-detector.

According to the present invention, preferably, a light beam diffracted at the first area of the four-divided diffraction grating is irradiated at least at the boundary between the first and second areas of the photo-detector; a light beam diffracted at the second area of the diffraction grating is irradiated at least at the boundary between the third and fourth areas of the photo-detector; and light beams diffracted at the other two areas of the diffraction grating are irradiated at least on the fifth and sixth areas of the photo-detector, respectively. As a result, for example, a tracking error signal in accordance with a push-pull method can be obtained for arithmetically operating detection signals obtained from the first to sixth detection areas of the photo-detector, and a tracking error signal in accordance with a differential phase detection method can be obtained by arithmetically operating a phase difference between the detection signals obtained from the first to sixth detection areas of the photo-detector. Thus, the first and second tracking error detectors can be switched in accordance with a difference in structure between optical storage media.

According to the present invention, preferably, the diffraction grating is formed of an optical member having such a specific anisotropy for polarization as not to diffract a light beam having the same linear polarization as that of a light beam entering in an optical disc but to diffract a light beam having a linear polarization in the direction perpendicular to the above specific direction at a specific diffraction efficiency, and a quarter wave plate is provided between the diffraction grating and the objective lens. As a result, since the diffraction grating does not diffract a going light beam passing through the objective lens and irradiated on the optical disc but selectively diffracts only a returning light beam reflected from the optical disc, it is possible to obtain a high light availability.

According to the present invention, preferably, there is provided a detecting means for detecting a difference in kind between the optical storage media, and a means for suitably switching the first and second tracking error signal detecting methods on the basis of the detected result.

According to the present invention, preferably, a holographic element is used as the diffraction grating, and the holographic element is made from a material having such an anisotropy for polarization as not to diffract a light beam having a linear polarization in a specific direction but to separately diffract a light beam having a linear polarization in the direction perpendicular to the above specific direction at a specific diffraction efficiency, and a quarter wave plate is provided between the holographic element and the objective lens.

Further, a collimator lens may be disposed between the light source and the objective lens; and the light source, photo-detector, and collimator lens may be contained in the same holder.

BRIEF DESCRIPTION OF THE DRAWINGS

FIG. 8 is a block diagram of a signal generating portion suitable for the third embodiment of the optical pickup of the present invention;

DESCRIPTION OF THE PREFERRED EMBODIMENTS

Hereinafter, embodiments of the present invention will be described with reference to the drawings.

Figure 1:
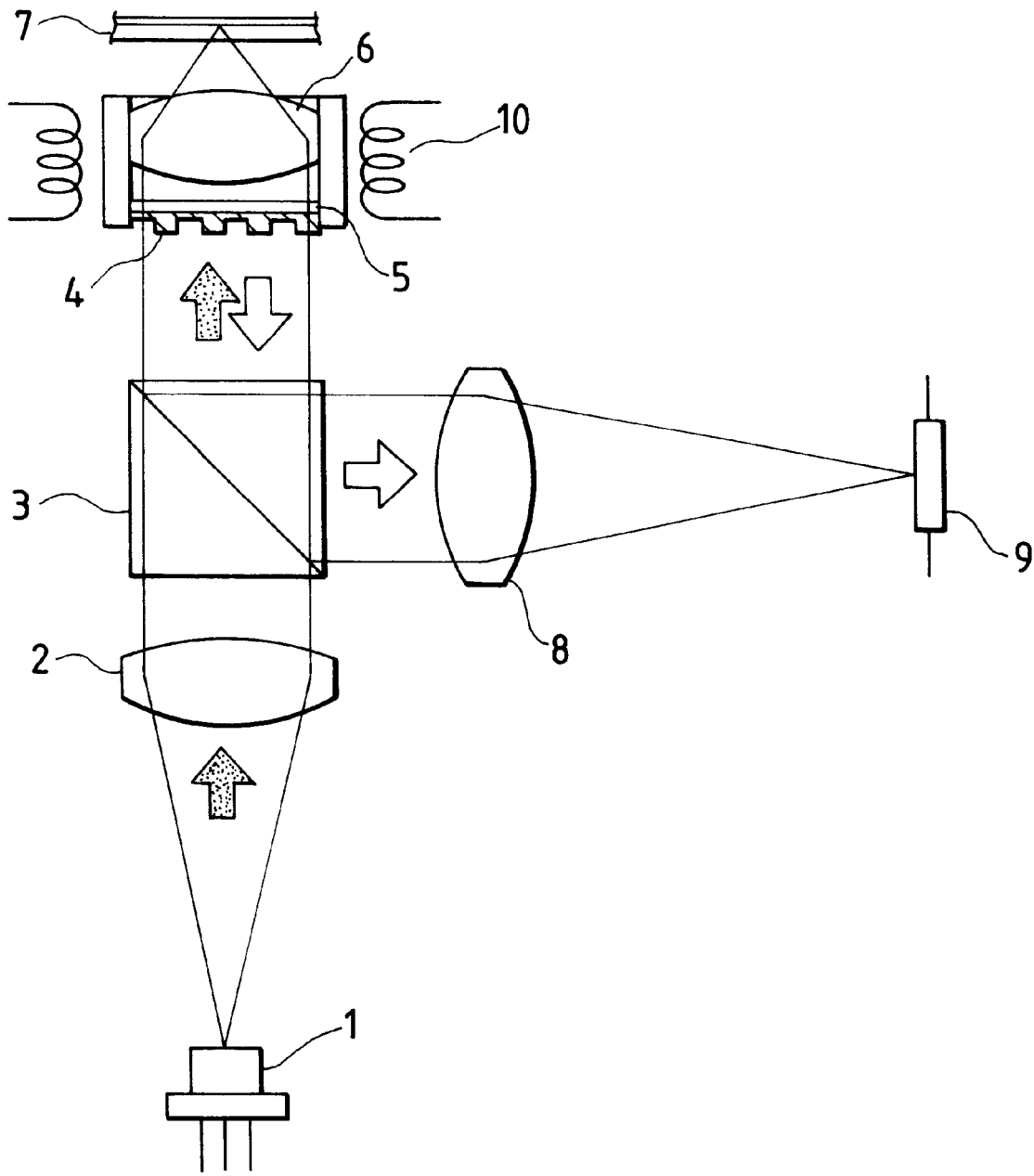
FIG. 1 is a schematic front view showing a first embodiment of an optical pickup according to the present invention.

FIG. 1 is a schematic front view showing a first embodiment of an optical pickup of the present invention.

In the figure, a light beam emitted from a laser diode 1 passes through a collimator lens 2 and a polarized beam splitter 3 and reaches a diffraction grating 4.

Figure 2:
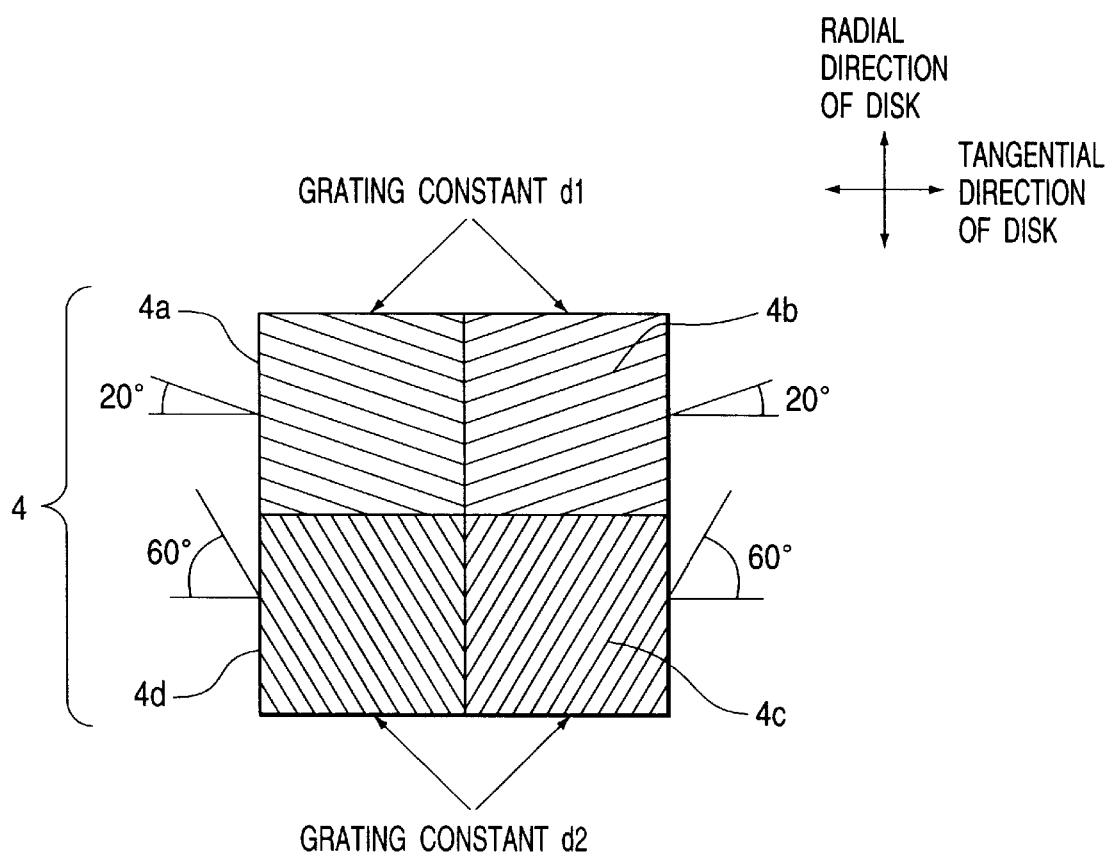
FIG. 2 is a plan view showing an example of a grating pattern of a diffraction grating suitable for the first embodiment of the optical pickup of the present invention.

FIG. 2 is a plan view showing one example of a grating pattern of a diffraction grating suitable for the first embodiment of the optical pickup of the present invention. As will be apparent from FIG. 2, the diffraction grating 4 is divided into four areas 4a, 4b, 4c, and 4d by cross-shaped boundary lines. Each of the areas has a specific grating pitch and a specific grating direction for allowing ±1st order diffracted light beams diffracted from the areas to go ahead in different directions. Further, in this embodiment, the diffraction grating 4 is formed of an optical member having such an anisotropy for polarization as to diffract little a light beam having the same polarization direction as that of a going light beam reaching an objective lens 6 through the diffraction grating 4, and to diffract only a light beam having a polarization direction perpendicular to that of the going light beam.

Referring to FIG. 1, a quarter wave plate 5 is disposed in an optical path between the diffraction grating 4 and the objective lens 6. With this configuration, the polarization direction of a going light beam is made perpendicular to that of a returning light beam, so that it is possible to prevent generation of unnecessary diffracted light beams in the going route and to separately generate ±1st order diffracted light beams necessary for signal detection only from the returning light beam. In addition, the present invention is not limited to the combination of the diffraction grating 4 formed of a member having an anisotropy for polarization and the quarter wave plate 5 shown in FIG. 1. For example, according to the present invention, a diffraction grating formed of a member having no anisotropy for polarization such as optical glass may be used. The present invention is not limited to the grating pattern of the diffraction grating 4 shown in FIG. 2. A known diffraction grating is formed of a member having an anisotropy for polarization or a member having no anisotropy for polarization, and a known grating pattern is formed of straight lines spaced at equal intervals, curves spaced at equal intervals, straight lines spaced at non-equal intervals, or curves spaced at non-equal intervals. An d, according to the present invention, any diffraction grating can be used in accordance with arrangement of detection areas of a photo-detector and the structure of the detection optical system.

In the embodiment shown in FIG. 1, the diffraction grating 4 and the quarter wave plate 4 are fixed, together with the objective lens 6, on a lens actuator 10 and are driven by the lens actuator 10 integrally with the objective lens 6. With this configuration, for example, even if the objective lens 6 is displaced in the radial direction of the optical disc upon tracking control, the position of the division lines of the diffraction grating 4 relative to a light beam reflected from the optical disc is not displaced, as a result of which there occurs little offset due to displacement of the objective lens 6 in a tracking error signal detected by the push-pull method (which will be described later). This is effective to usually detect a good signal. However, the present invention is not limited thereto, and for example, it may be considered that the diffraction grating 4 and the quarter wave plate 5 are mounted not on the lens actuator 10 but on a chassis of the optical pickup.

A light beam having passed through the diffraction grating 4 and the quarter wave plate 5 are condensed on an optical disc 7 through the objective lens 6. The light beam reflected from the optical disc 7 passes through the objective lens 6 and the quarter wave plate 5 again and reaches the diffraction grating 4. At this time, as described above, since the polarization direction of the light beam entering in the diffraction grating 4 is perpendicular in polarization direction to the above going light, ±1st order diffracted light beams are separately generated from each of the areas 4a, 4b, 4c and 4d of the grating 4 and go ahead in specific directions. Each diffracted light beam is reflected from a polarized beam splitter 3, and enters in a specific detection area of eight-division type photo-detector 9 through a detection lens 8.

In the diffraction grating 4 shown in FIG. 2, the areas 4a, 4b, 4c and 4d of the grating 4 are different from each other in grating direction (angle) and grating interval (pitch). The grating angle of each of the areas 4a to 4d determines the direction of a light beam having been reflected from the optical disc and passing through the diffraction grating 4, and the grating pitch determines the angle of diffraction of the light beam passing through the diffraction grating 4.

Figure 3:
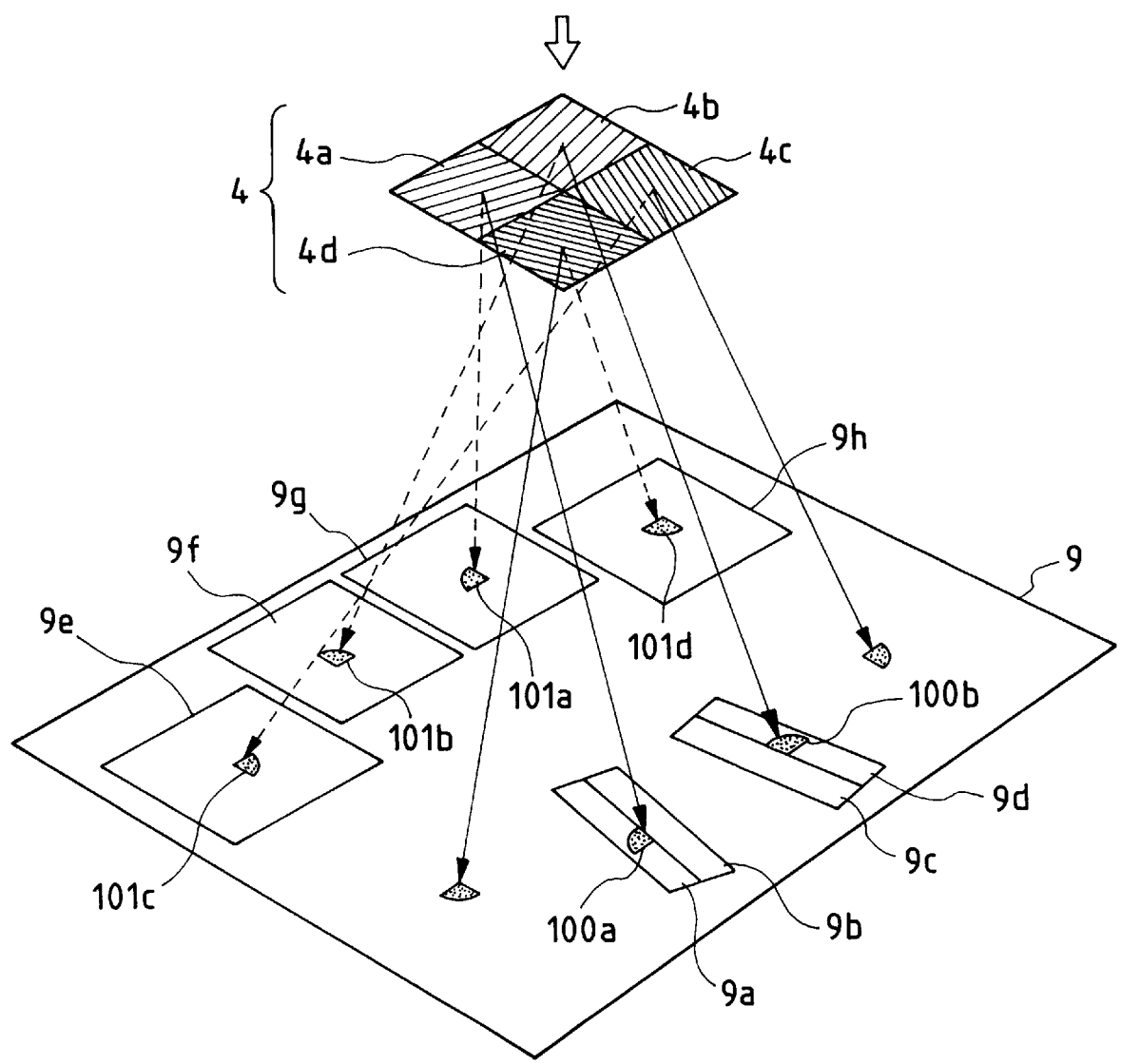
FIG. 3 is a perspective view showing an example of an arrangement of detection areas of a multi-division type photo-detector suitable for the first embodiment of the optical pickup of the present invention.

FIG. 3 is a perspective view showing an example of an arrangement of detection areas of a multi-division type photo-detector suitable for the first embodiment of the optical pickup of the present invention. In FIG. 3, the eight-division type photo-detector 9 has four-divided detection areas 9a, 9b, 9c and 9d disposed in strip-shapes, and square or rectangular detection areas 9e, 9f, 9g and 9h each being larger in detection area than the stripe-shaped detection area. Of ±1st order diffracted light beams separately generated at the area 4a of the diffraction grating 4, for example, the +1st order diffracted light beam (shown by a solid line) is converged at a boundary line between the detection areas 9a and 9b to form a light spot 100a, and the −1st order diffracted light beam (shown by a dotted line) is converged on the detection area 9g which is point-symmetrical to the detection area 9a with respect to the center optical axis to form a light spot 101a. Similarly, of ±1st order diffracted light beams separately generated at the area 4b of the diffraction grating 4, the +1st order diffracted light beam is converged at a boundary line between the detection areas 9c and 9d to form a light spot 100b, and the −1st order diffracted light beam is converged on the detection area 9f to form a light spot 101b. Further, of ±1st order diffracted light beams separately generated at the area 4c of the diffraction grating 4, the −1st order diffracted light beam is converged on the detection area 9e to form a light spot 101c. Similarly, of ±1st order diffracted light beams separately generated at the area 4d of the diffraction grating 4, the −1st order diffracted light beam is converged on the detection area 9h to form a light spot 101d. In this way, the diffracted light beams separately generated at four-divided areas of the diffraction grating are converged on different light detection areas and are independently detected at the detection areas in terms of light intensity.

Figure 4:
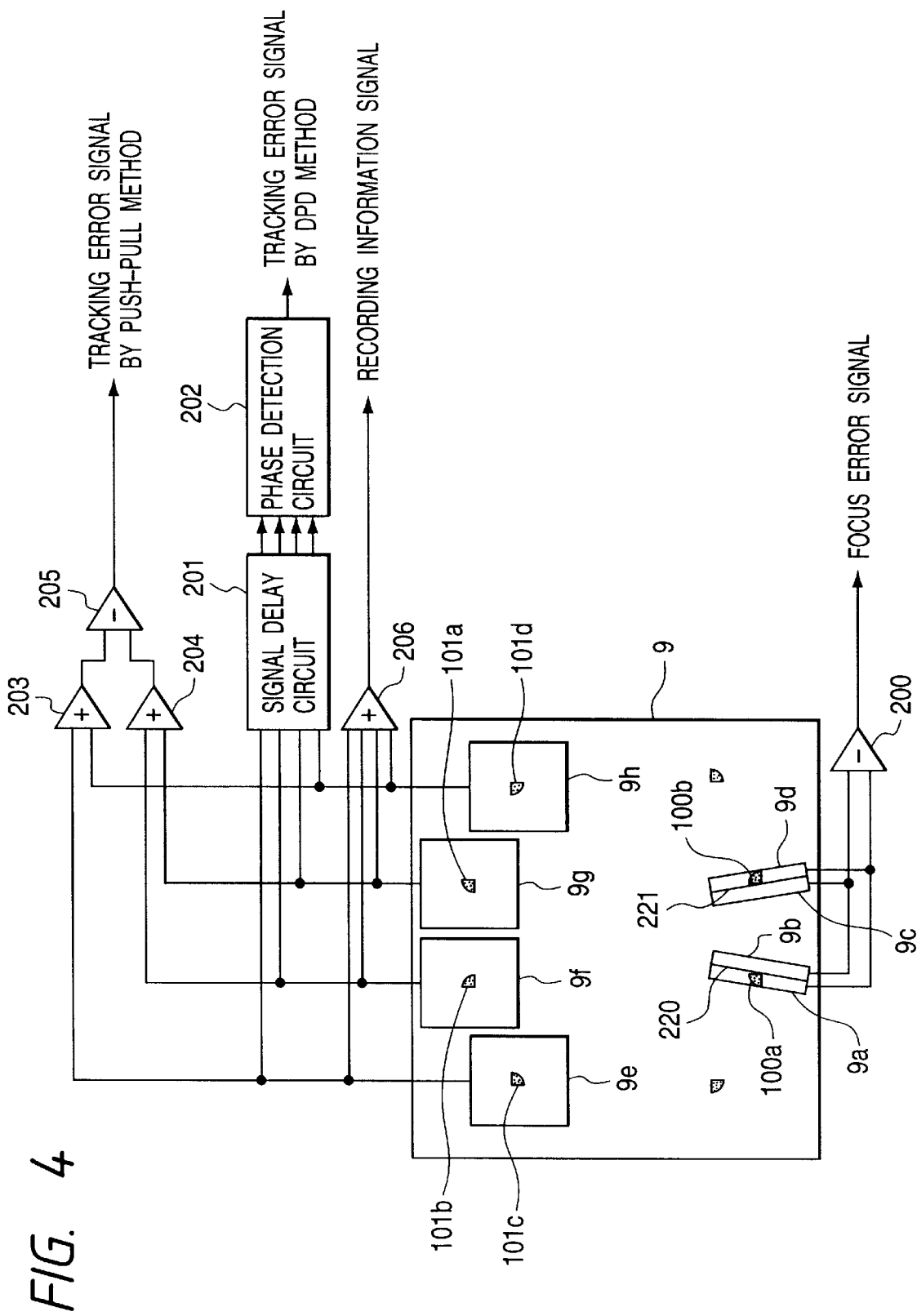
FIG. 4 is a block diagram showing an example of a signal generating portion suitable for the first embodiment of the optical pickup of the present invention.

FIG. 4 is a block diagram showing an example of a signal generating portion suitable for the first embodiment of the optical pickup of the present invention. A manner of outputting a focus error signal and each tracking error signal from light intensity signals detected by the detection areas of the photo-detector 9 will be described below with reference to FIG. 4. Each error signal is detected as follows. First, since the light spots 100a and 100b are formed at the boundary line between the light detection areas 9a and 9b and at the boundary line between the detection areas 9c and 9d, respectively, a focus error signal in accordance with a so-called double knife edge method can be detected by inputting an addition signal of output signals from the detection areas 9a and 9b and an addition signal of output signals from the detection areas 9b and 9c in an operational amplifier 200 and detecting a difference signal therebetween by the operational amplifier 200. On the other hand, since output signals from the detection areas 9e, 9f, 9g and 9h are equivalent to light intensity signals, obtained at the divided areas 4a to 4d, of the four light beams divided from the light beam reflected from the optical disc 7 by the cross-shaped division lines, a tracking error signal in accordance with a so-called DPD method can be detected by inputting these output signals in a phase detection circuit 202 through a signal delay circuit 201. It is to be noted that the DPD method is the known technique, and therefore, the explanation thereof is omitted. Further, an addition signal of output signals from the detection areas 9e and 9h is detected by an operational amplifier 203, and an addition signal of output signals from the detection areas 9f and 9g are similarly detected by an operational amplifier 204. Since each signal is equivalent to a light intensity signal, detected at each area, of each of the two light beams divided from the light beam reflected from the optical disc 7 in the radial direction of the optical disc, a tracking error signal in accordance with a so-called push-pull method can be detected by detecting a difference signal between these signals by an operational amplifier 205.

In this way, a focus error signal and two kinds of tracking error signals different in detection method can be simultaneously obtained by arithmetically operating the detection signals obtained from only one piece of the eight-division type photo-detector. Accordingly, in the case of performing recording or reproducing for optical discs having different structures, that is, a rewritable disc having continuous guide groove and a read only disc having no guide groove as described above, the tracking error signal detecting detector most suitable for a structure of each optical disc can be selected by the optical pickup of the present invention.

In this embodiment, a recording information signal recorded in the optical disc is detected on the basis of an addition signal of the output signals obtained from the detection areas 9e, 9f, 9g and 9h for detection of the tracking error signal; however, the present invention is not limited thereto. For example, the recording information signal may be detected on the basis of the output signals from the detection areas 9a, 9b, 9c and 9d for detection of the focus error signal or on the basis of an addition signal of output signals obtained form all of the detection areas. However, the manner adopted in this embodiment, in which the recording information signal is detected not from the detection areas 9a to 9d for detection of a focus error signal but from the detection areas 9e to 9h for detection of a tracking error signal, is advantageous in that there does not arise a problem in lowering of a frequency characteristic of a detection signal which possibly occurs in the case where a light spot is irradiated at the boundary line between light detection areas, and that since the detection areas 9a to 9d can be specialized for detection of a focus error signal, each of these detection areas 9a to 9d is not required to have a high frequency band and also a relatively inexpensive low frequency band type amplifier can be used as a current-voltage conversion amplifier connected to an output terminal of the above detection area.

Incidentally, the arrangement of the detection areas of the photo-detector 9 is not limited to the pattern shown in FIGS. 3 and 4, and may include any pattern capable of independently detecting +1st order diffracted light beam, −1st order diffracted light beam, or ±1st order diffracted light beams separately generated from each of four diffracted light beams divided from a light beam reflected from the optical disc 7 by cross-shaped division lines and detecting a focus error signal in accordance with the so-called knife edge method on the basis of the diffracted light beams at one or two areas of the diffraction grating. Accordingly, the combination of ±1st order diffracted light beams separately generated from each area of the diffraction grating 4 and detection areas of the photo-detector 9 or boundary lines between the detection areas on which the ±1st order diffracted light beams are to be irradiated is not limited to that shown in the previous embodiment.

That is, detection areas of the photo-detector 9 may include, at least, first and second areas with a boundary line put therebetween, third and fourth areas with a boundary line put therebetween, a fifth area independent from the first to fourth areas, and a sixth area independent from the first to fifth areas. By use of the photo-detector having these detection areas, two kinds of tracking error detection signals, a focus error signal, and a recording information signal can be obtained by irradiating either or both of a +1st order diffracted light beam and a −1st order diffracted light beam separately generated from each area of the diffraction grating 4 on the boundary line between the first and second areas, the boundary line between the third and fourth areas, and the fifth and sixth areas, and by using arithmetically operating signals obtained from the areas and boundary lines.

In the embodiment shown in FIG. 4, of the four-divided detection areas 9a, 9b, 9c and 9d for detection of a focus error signal, the boundary line 220 between the detection areas 9a and 9b and the boundary line 221 between the detection areas 9c and 9d are disposed not in parallel to each other but slightly obliquely (broadened toward one end side). Such an arrangement of the boundary lines 220 and 221 is set to suppress an offset of a focus error signal which occurs in the case where the wavelength of a laser beam emitted from the laser diode 1 is varied due to a change in environmental temperature so that the angle of diffraction of +1st order diffracted light beams separately generated at the diffraction grating 4 is varied and thereby the convergent light spots 100a and 100b are displaced on the photo-detection areas 9a, 9b, 9c and 9d, or in the case where the photo-detector 9 is offset relative to the convergent light spots 100a and 100b. The tilting angle of each of the boundary lines 220 and 221 is not limited to that in the embodiment shown in FIG. 4, and may be freely designed in accordance with the structure of an optical pickup.

As is apparent from FIG. 3, the optical pickup of the present invention is configured that the photo-detector receives ±1st order diffracted light beams separately generated by the diffraction grating 4. Accordingly, it is advantageous to make the diffraction efficiency of ±1st order diffracted light beams as high as possible. In general, for an irregular type (phase type) diffraction grating, in the case where a difference in optical path length between a projection and a recess is substantially equal to a half-wavelength of a light beam multiplied with an odd number, the diffraction efficiency of 0 order diffracted light beams becomes substantially zero and the diffraction efficiency of ±1st order diffracted light beams is maximized. Accordingly, the diffraction grating 4 according to the present invention may be set at the above-described grating depth. This is effective to obtain a relatively high detection efficiency and to prevent generation of stray light.

Figure 5:
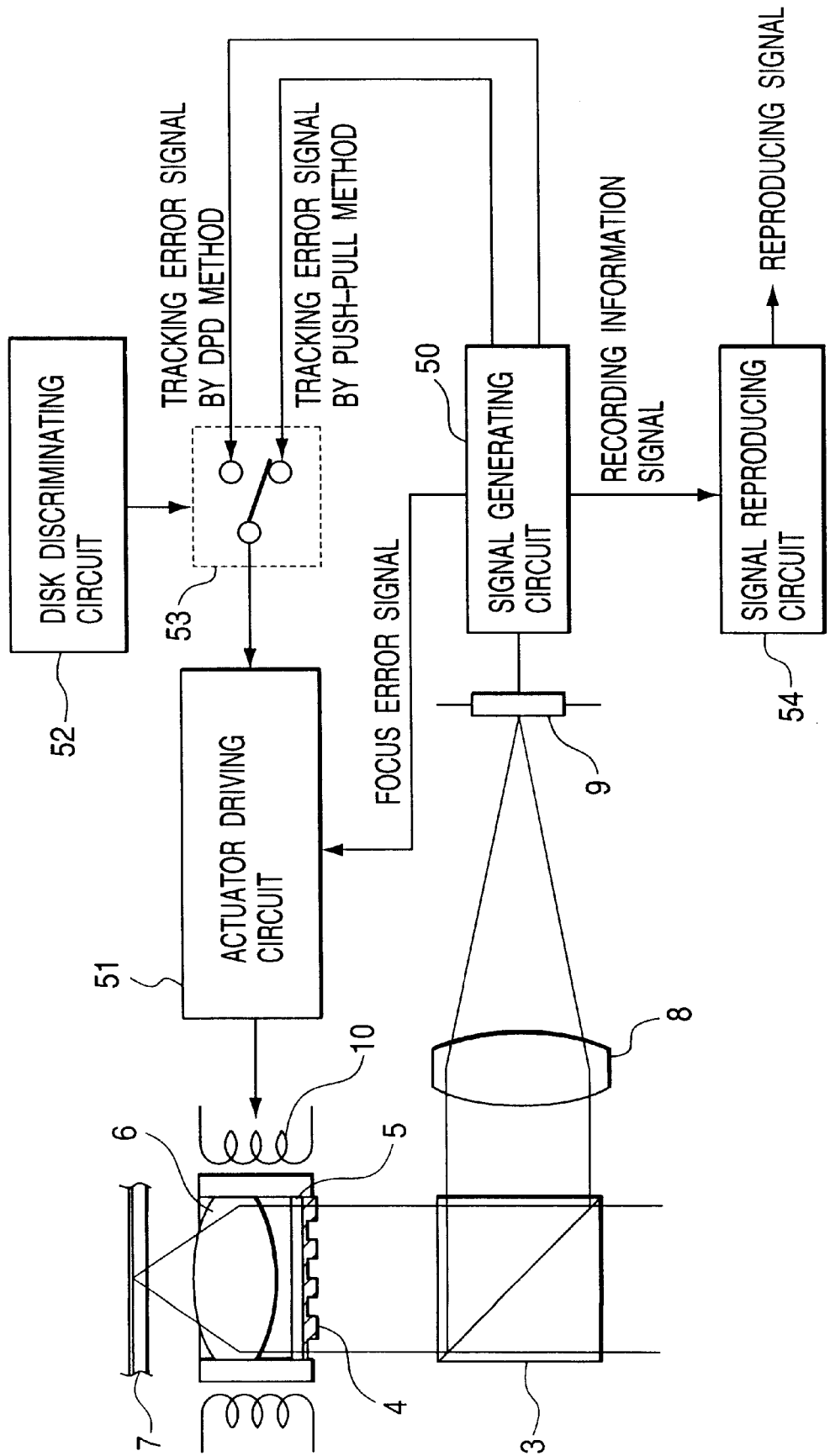
FIG. 5 is a block diagram showing an example of an optical disc device using the first embodiment of the optical pickup of the present invention.

FIG. 5 is a block diagram showing an example of an optical disc device using the first embodiment of the optical pickup of the present invention. An optical pickup shown in FIG. 5 has the same configuration as that of the embodiment shown in FIG. 1, and therefore, only an essential portion of the optical pickup is depicted in FIG. 5.

A light intensity signal obtained from each detection area of the photo-detector 9 is supplied to a signal generating circuit 50, whereupon it is subjected to the above-described arithmetic operation, to detect a focus error signal and tracking error signals. Of the error signals thus detected, the focus error signal is directly inputted in a lens actuator drive circuit 51. The tracking error signals, which have been obtained in accordance with the DPD method and the push-pull method, are supplied to a witching circuit 53. The optical disc device of the present invention has a disc discriminating circuit 52 for discriminating the kind of an optical disc, and it is discriminated by the disk discriminating circuit 52 whether the reproduced optical disc is of a rewritable type or a read only type. The switching circuit 53 is, on the basis of the discriminated result, operated to select the tracking error signal obtained in the accordance with the detecting method suitable for the structure of the optical disc and to supply the signal to the lens actuator drive circuit 51. The lens actuator drive circuit 51 outputs a specific lens actuator drive signal on the basis of the focus error signal and the tracking error signal thus supplied, to drive the lens actuator 10, thereby displacing the objective lens 6, diffraction grating 4, and quarter wave plate 5 simultaneously.

In optical discs generally used at present, not only the most suitable tracking error signal detecting method may differ depending on the structure of the disc; but also the most suitable objective lens may differ depending on a difference in substrate thickness, and the most suitable wavelength of a light beam may differ depending on a difference in recording medium. To cope with the former case, for example, there may be provided a plurality of objective lenses corresponding to various thicknesses of the disc substrates and a mechanism for suitably switching the objective lenses, wherein the difference in optical disk is discriminated by the disk discriminating circuit 52 and the tracking error signal detecting method and the objective lens most suitable for the discriminated optical disk are selected. To cope with the latter case, there may be used an optical pickup including two light sources different in wavelength, wherein the light source most suitable for the kind of the optical disc is selected.

Incidentally, the optical pickup described above has the configuration that the diffraction grating 4 is disposed in close proximity to the objective lens 6 and is driven integrally with the objective lens 6. However, as described above, the present invention is not limited to the above configuration, and the diffraction grating 4 may be disposed at any position insofar as it is in a returning optical path from the objective lens 6 and the photo-detector 9. One example of such an arrangement will be described below with reference to FIG. 6.

Figure 6:
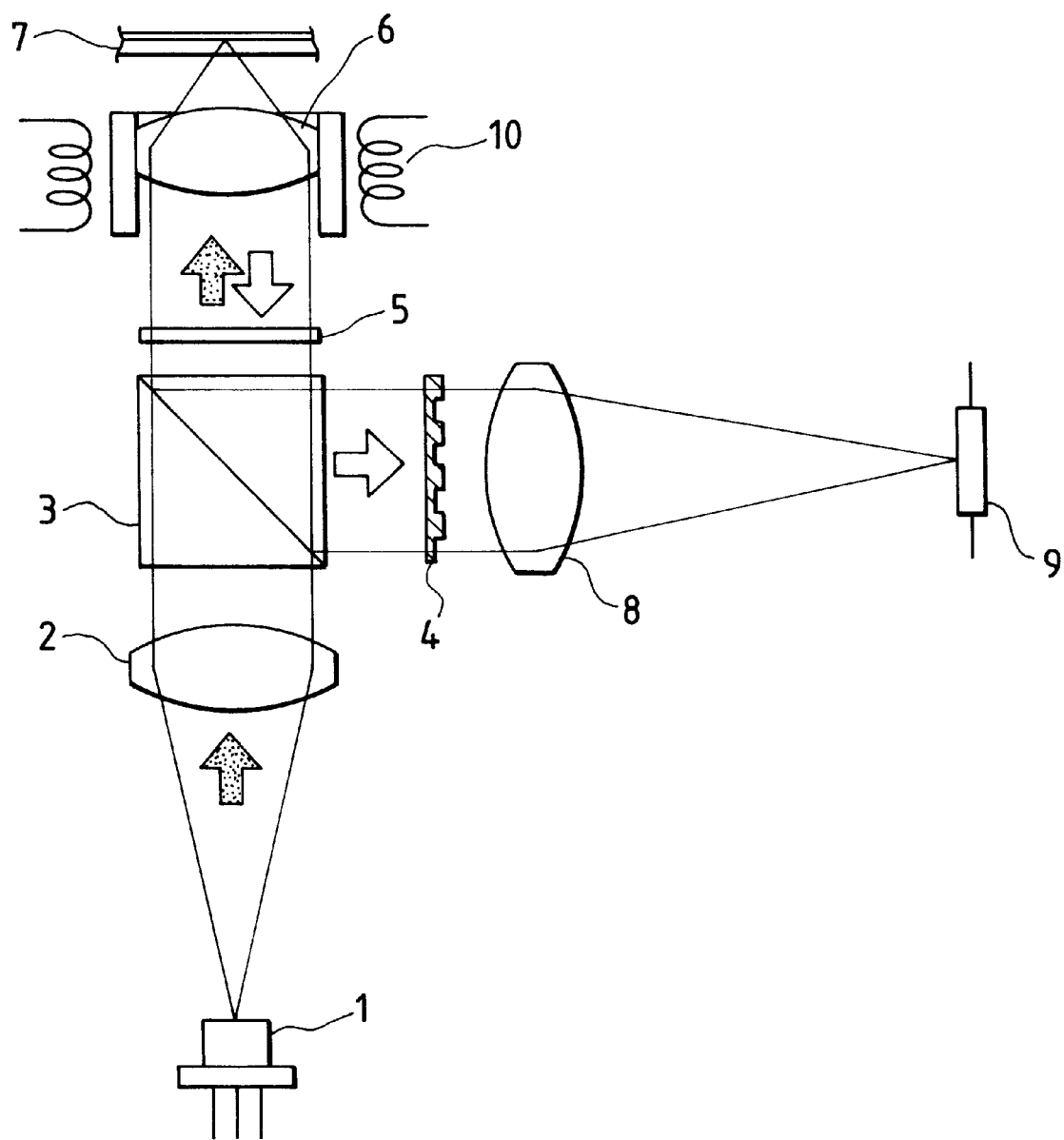
FIG. 6 is a schematic front view showing a second embodiment of the optical pickup of the present invention.

FIG. 6 is a schematic front view showing a second embodiment of the optical pickup of the present invention. In the figure, parts corresponding to those in the first embodiment shown in FIG. 1 are indicated by the same reference numerals.

Referring to FIG. 6, a diffraction grating 4 is disposed in an optical path between a polarized beam splitter 3 and a detection lens 8. This embodiment has the same configuration as that of the first embodiment shown in FIG. 1, except for the arrangement of the diffraction grating 4, and is allowed to detect various error signals on the same signal detection principle as that described with reference to FIGS. 1 to 4. In this embodiment, since the diffraction grating 4 and the quarter wave plate 5 are not required to be driven together with the objective lens 6, the load applied to the lens actuator 10 can be reduced, and since the diffraction grating 4 is disposed in an optical path along which only a light beam reflected from the optical disc travels, the diffraction grating 4 is not required to be formed of an optical member having an anisotropy for polarization for enhancing the light availability as described in the embodiment of FIG. 1 and it may be form of a usual optical glass member or optical plastic member. This is advantageous in manufacturing the optical pickup at a relatively low cost.

Incidentally, in the above-described embodiment, as the grating pattern of the diffraction grating 4, the linear pattern is used; however, the present invention is not limited thereto. For example, a curved grating pattern, that is, a holographic grating may be used. The diffraction grating having such a curved pattern is advantageous in that since the diffraction grating exhibits a lens action, it is possible to enhance the degree of freedom in design of the optical system of the optical pickup by, for example, omitting the detection lens 8.

Figure 7:
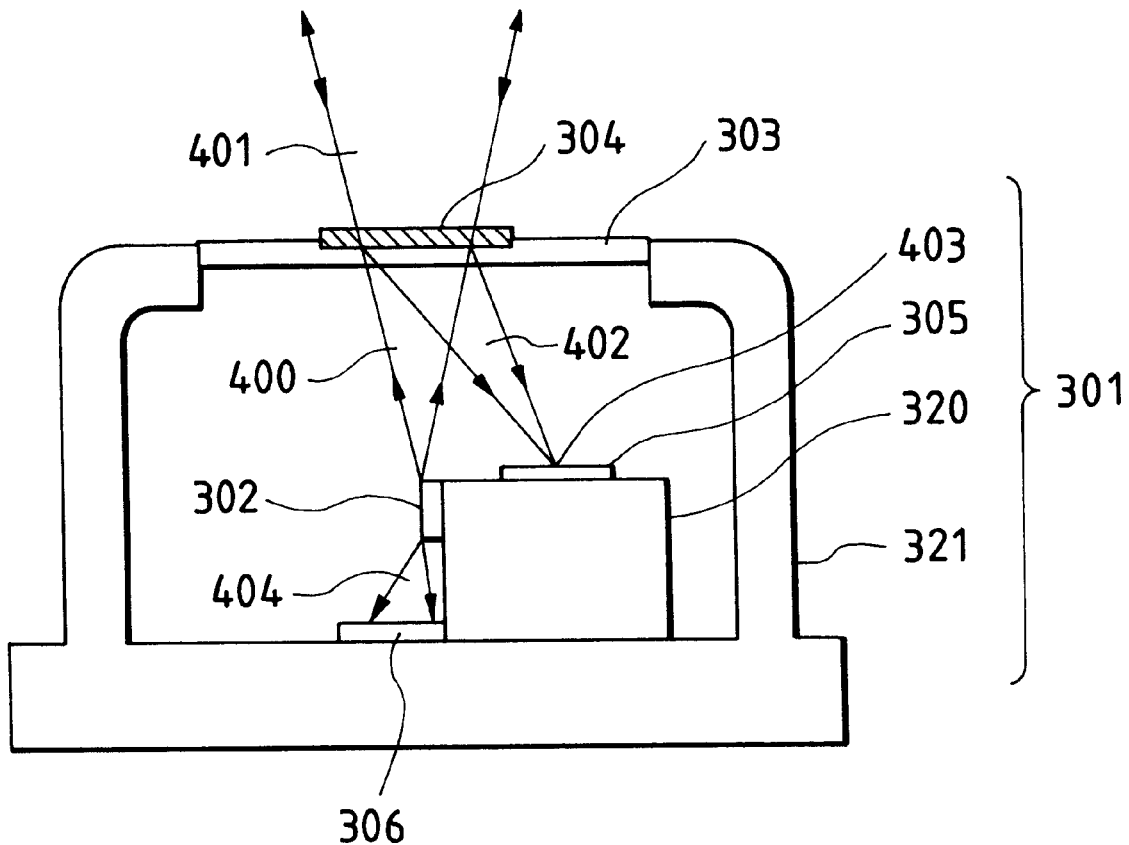
FIG. 7 is a schematic sectional view showing an essential portion of a third embodiment of the optical pickup of the present invention.

An optical pickup using a holographic element will be described below with reference to the figures. FIG. 7 is a sectional view showing an essential portion of a third embodiment of the optical pickup of the present invention.

Referring to FIG. 7, a laser diode 302 is fixed on a stem 320 disposed in an optical head module 301. A light beam 400 is emitted upward in the figure from the laser diode 302. A window area 303 made from a transparent optical glass or optical plastic is provided at a position over the laser diode 302, and a holographic element 304 is provided at a portion of the window area 303. The holographic element 304 is divided into four areas by cross-shaped boundary lines (which will be described later). Each area of the holographic element 304 has a grating of a specific pattern. A light beam 400 entering in the holographic element 304 is separated into a light beam 401 passing through the holographic element 304 and a diffracted light beam (not shown) diffracted from the holographic element 304, and only the transmission light beam 401 passes through a collimator lens (not shown) and an objective lens (not shown) and is condensed on an optical disc.

On the other hand, the light beam reflected from the optical disc is returned nearly along the same optical path as that for the going light beam, and reaches the holographic element 304 again. The holographic element 304 separately generates ±1st order diffracted light beams 402 from the light beam reflected from the optical disc, and forms a convergent light spot 403 on a detection area of a photo-detector 305 provided on the stem 320. The photo-detector 305 has multi-divided light detection areas (which will be described later), and it performs photoelectric transfer of changes in light intensity of the reflected light beam 402 irradiated on each detection area, followed by specific arithmetic operation, and detects positional error signals at spots on the optical disc such as a focus error signal and a tracking error signal, and an information signal recorded in the optical disc. An optical output monitoring photo-detector 404 is disposed under the laser diode 302, which receives a light beam emitted from the back side of the laser diode 302 and controls the intensity of the light beam outputted from the laser diode 302 to be fixed. In addition, these optical parts are accumulated and sealed in the same package 321.

FIG. 8 is a block diagram of a signal generating portion used for the third embodiment of the optical pickup of the present invention. In addition, only an essential portion of the optical head module 1 is shown by the perspective view in FIG. 8 for showing details of the holographic element 304 and the photo-detector 305 shown in FIG. 7.

The holographic element 304 provided over the laser diode 302 is divided into four areas by cross-shaped boundary lines as shown in the figure. The areas are provided with gratings different in pattern. The grating is slightly curved for adjusting a focal length. The light beam reflected from the optical disc enters, from the upper side in the figure, in the holographic element 304, and is diffracted by the holographic element 304, to be separated into ±1st order diffracted light beams 402a, 402b, 402c, and 402d for respective areas. On the other hand, the photo-detector 305 has six-divided strip shaped detection areas a, b, c, d, e and f. The diffracted light beam 402a enters in the detection area a of the photo-detector 305 to form a convergent light spot 403a; the diffracted light beam 402b enters in a boundary area between the detection areas b and c of the photo-detector 305 to form a convergent light spot 403b; the diffracted light beam 402c enters in a boundary area between the detection areas d and e of the photo-detector 305 to form a convergent light spot 403c; and the diffracted light beam 402d enters in a detection area f of the photo-detector 5 to form a convergent light spot 403d.

In addition, the combination of the light beams diffracted at the areas of the holographic element 304 and the detection areas of the photo-detector 305 or boundary areas between the detection areas on which the diffracted light beams are to be irradiated, is not limited to that in the previous embodiment, and may be freely designed.

In consideration of the fact that a change in light intensity of each diffracted light spot entering in each detection area of the photo-detector 305 is photo-electrically transferred for each detection area, output signals from the detection areas a, b, c, d, e, and f are indicated by characters A, B, C, D, E, or F. Thus, these output signals are arithmetically operated by the following operational circuits, to detect various error signals and an infirmation signal. Specifically, an addition signal (B+C) of the output signals B and C from the detection areas b and c obtained by an operational amplifier 503, an addition signal (D+E) of the output signals D and E from the detection areas d and e obtained by an operational amplifier 504, and the output signal A from the detection area a and the output signal F from the detection area f are equivalent to light intensity signals of the four-divided areas at which the light beam reflected from the optical disc is divided into the four diffracted light beams. These output signals are inputted in a phase detection circuit 506 through a signal delay circuit 505, to detect a tracking error signal in accordance with the so-called DPD method. It is to be noted that the DPD method is the known technique, and therefore, the detailed explanation is omitted.

On the other hand, an addition signal (A+D+E) of the output signals A, D and E from the detection areas a, d, and e are detected by the operational amplifier 504 and an operational amplifier 507, and an addition signal (B+C+F) of the output signals B, C and F from the detection areas b, c and f are detected by the operational amplifier 503 and an operational amplifier 508. Then a difference signal [(A+D+E)−(B+C+F)] is detected by an operational amplifier 509. This signal is equivalent to a difference signal between light intensity signals at the two-divided areas at which a light beam reflected from the optical disc is divided into the two diffracted light beams in the radial direction. Thus, a tracking error signal in accordance with the so-called push-pull method can be detected on the basis of the above signal.

In this way, according to this embodiment, the two kinds of tracking error signals in accordance with the different detecting methods can be obtained by arithmetically operating the detection signals obtained by only one multi-division type photo-detector, so that the detecting method most suitable for the structure of the optical disc can be selected. An information signal recorded in the optical disc can be reproduced by detecting an addition signal (A+B+C+D+E+F) of the output signals from all the detection areas using the operational amplifiers 503, 504, 507, 508, and 510.

An addition signal (B+E) of the output signals B and E from the detection areas b and e, which is obtained by an operational amplifier 500, and an addition signal (C+D) of the output signals C and D from the detection areas c and d, which is obtained by an operational amplifier 501, are inputted in an operational amplifier 502, to detect a difference signal [(B+E)−(C+D)]. Thus, a focus error signal in accordance with the so-called double knife edge method (which will be described later) can be obtained on the basis of the above difference signal.

Figure 9A:
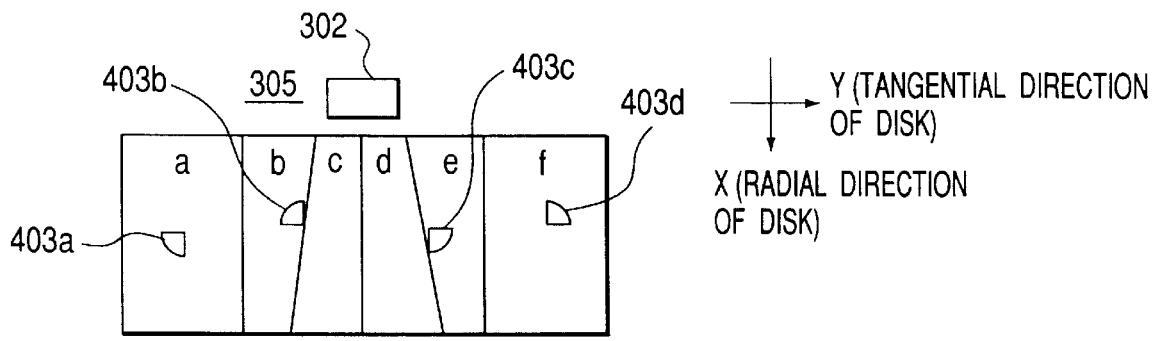
FIGS. 9(a), 9(b) and 9(c) are plan views each showing multi-division type photo-detector suitable for the third embodiment of the optical pickup of the present invention and convergent states of light spots irradiated on the photodetector.
Figure 9B:
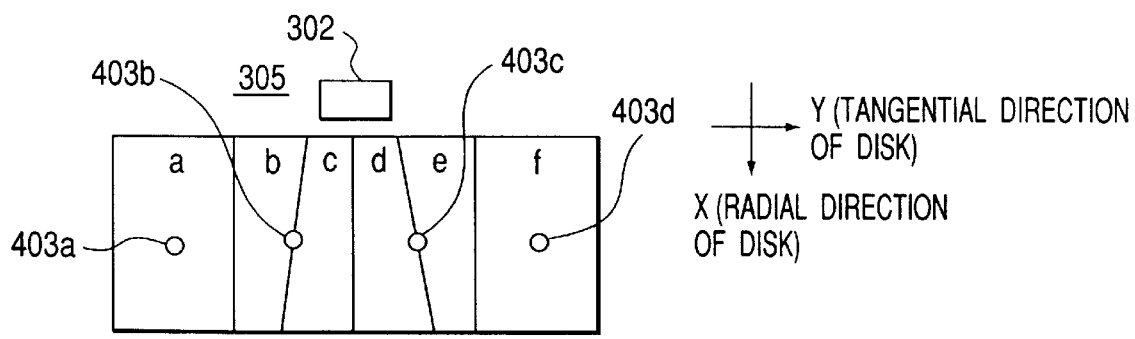
Figure 9C:
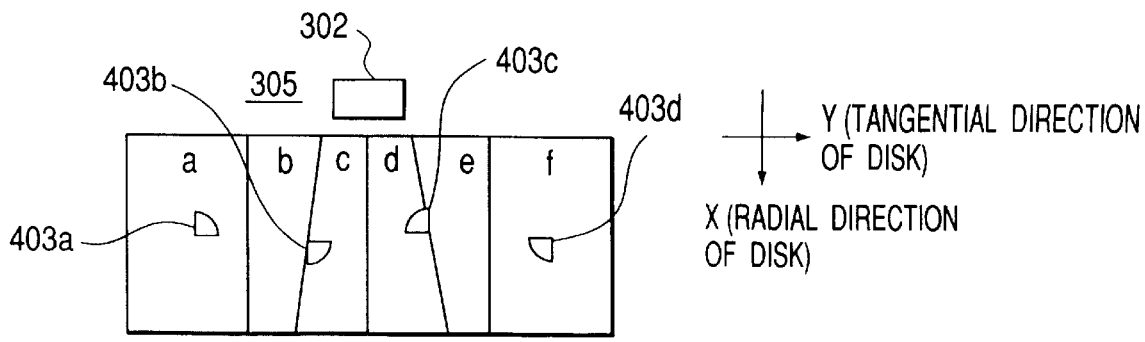

FIGS. 9(*a*), 9(*b*) and 9(*c*) are plan views each showing a multi-division type photo-detector suitable for the third embodiment of the optical pickup of the present invention and convergent states of light spots formed on detection areas of the photo-detector.

In these figures, there are shown convergent states of light spots of a light beam reflected from an optical disc formed on detection areas of the photo-detector 305 shown in FIGS. 7 and 8. Specifically, according to this embodiment, the grating direction of the holographic element 304 and the position of the photo-detector 305 are set such that in the case where the optical disc is at a just focusing point, as shown in FIG. 9(*b*), the light spot 403*b* is converged to diffraction limit at the boundary line between the detection areas b and c and the light spot 403*c* is converged to diffraction limit at the boundary line between the detection areas d and e. At this time, as shown in FIG. 9(*b*), the light spot 403*a* is accurately formed on the detection area a, and the light spot 403*d* is also accurately formed on the detection area f. When the optical disc is moved, in such a state, close to or apart from the objective lens with respect to the just focusing point, the light spots 403*a*, 403*b*, 403*c* and 403*d* are correspondingly defocused. For example, when the optical disc is moved closer to the objective lens, as shown in FIG. 9(*a*), the light spots 403*b* and 403*c* are extended on the detection area b side and the detection area e side, respectively. As a result, a light intensity signal detected at each of the detection areas b and e becomes larger than a light intensity signal detected at each of the detection areas c and d. On the other hand, when the optical disc is moved apart from the objective lens, as shown in FIG. 9(*c*), the light spots 403*b* and 403*c* are extended on the detection area c side and the detection area d side, respectively. As a result, reversely to the above case, a light intensity signal detected at each of the detection areas c and d becomes larger than a light intensity signal detected at each of the detection areas b and e. To cope with such an inconvenience, as described above, a difference signal of light intensity signals detected at respective detection areas, that is, a difference signal [(B+E)−(C+D)] is detected. Thus, there can be obtained a focus error signal in accordance with the so-called double knife edge method.

As described above, according to the present invention, by use of the optical head module including one holographic element and one multi-division type photo-detector, it is possible to detect a focus error signal in accordance with the double knife edge method and to detect a tracking error signal in accordance with the DPD method or push-pull method. Thus, there can be realized an optical pickup usable for a rewritable disc and a read only disc by suitably switching the above two kinds of the tracking error signal detection methods in accordance with a difference between optical discs.

In the photo-detector 305 of the embodiment shown in FIG. 9, the boundary line between the detection areas b and c and the boundary line between the detection areas d and e are depicted not to be in parallel to the boundary line between the detection areas a and b and the boundary line between the detection areas e and f but to be spaced with a distance gradually extended as being separated apart from the laser diode 302. Such an arrangement of the non-parallel boundary lines is performed to cope with the fact that the wavelength of a light beam emitted from the laser diode 302 is varied depending on temperature change or the like so that the angle of diffraction of the light beam diffracted by the holographic element 304 is varied and thereby the positions of the light spots 403*b* and 403*c* are shifted. More specifically, in order that even if there occurs such a shifting, the light spots 403*b* and 403*c* can be usually accurately formed on the boundary line between the detection areas b and c and the boundary line between the detection areas d and e, the boundary lines are arranged substantially along the shifting loci of the positions of the light spots 403*b* and 403*d*. The directions of the above boundary lines, therefore, are not limited to those in the embodiment shown in FIGS. 9(*a*) to 9(*c*).

Incidentally, the third embodiment shown in FIGS. 7 and 8 and FIGS. 9(*a*) to 9(*c*) is configured that, of light beams diffracted from a light beam reflected from an optical disc by the holographic element 304, only +1st order diffracted light beams are received by the photo-detector 305. That is, other diffracted light beams, for example, −1st order diffracted light beams and other high order diffracted light beams do not contribute to signal detection. As a result, it is desired to enhance the diffraction efficiency of a +1st order diffracted light beam entering in the photo-detector 305 and to suppress generation of other diffraction light beams. As a means for enhancing the diffraction efficiency of only a +1st order diffracted light beam, blazing for grooves of the diffraction grating is effective. The blazing is a means of making asymmetric diffraction efficiencies of ±1st order diffracted light beams by forming the sectional shape of the holographic element 304 into a saw-tooth shape or a stepped shape as shown in FIG. 10.

Figure 10:
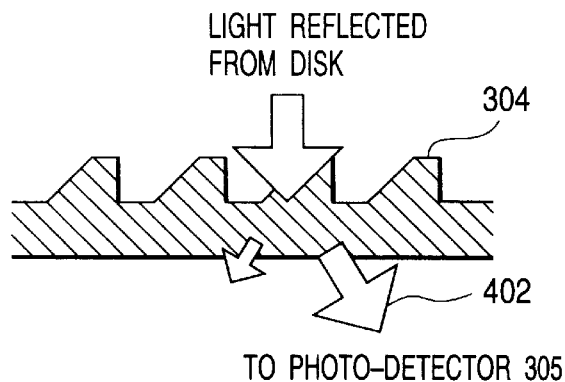
FIG. 10 is a sectional view showing one example of a sectional shape of a holographic element suitable for the third embodiment of the optical pickup of the present invention.

FIG. 10 is a sectional view showing one example of a sectional shape of a holographic element suitable for the third embodiment of the optical pickup of the present invention. The sectional shape of the holographic element 304 shown in FIG. 10 is effective to increase the diffraction efficiency of a diffracted light beam diffracted in the lower right direction (shown by a large-sized arrow) and decrease the diffraction efficiency of a diffracted light beam diffracted in the lower left direction (shown by a small-sized arrow), as compared with the usual sectional shape of the holographic grating. By use of the holographic element 304 subjected to the above blazing, various signals can be detected at a higher efficiency.

While the objective lens is not shown in FIG. 7, the holographic element 304 is disposed between the laser diode 302 and the objective lens. Accordingly, a going light beam, which is emitted from the laser diode 302 and is irradiated on the optical disc through the objective lens, also enters in the holographic element 304, as a result of which there occur unnecessary diffracted light beams not contributing to signal detection. To prevent generation of unnecessary diffracted light beams and to improve the light availability of the optical pickup, it is effective to combine a holographic element having an anisotropy for polarization and a quarter wave plate. That is, the holographic element 304 is made from an optical material (for example, lithium niogate LiNbO3) having such an anisotropy for polarization as to make substantially zero the diffraction efficiency of a going light beam in a direction of polarization (for example, P-polarized light), that is, to allow the going light beam to little generate diffracted light beams; and allow a light beam having the direction of diffraction (for example, S-polarized light) perpendicular to the above direction of polarization to generate diffracted light beams at a specific diffraction efficiency. The quarter wave plate is also disposed between the holographic element 304 having an anisotropy for polarization and the objective lens so that the light beam passes through the quarter wave plate for each of the going and returning optical paths. By provision of such a quarter wave plate, when reaching the holographic element 304, the returning light beam reflected from the optical disc is set to have the direction of diffraction (for example, S-polarized light) perpendicular to the direction of polarization (for example, P-polarized light) of the going light beam. With this configuration, it is possible to suppress unnecessary diffracted light beams as much as possible in the going path and also to desirably diffract, in the returning path, the light beam reflected from the optical disc and introduce the diffracted light beams to detection areas of the photodetector 305.

In addition, another embodiment using the holographic element having an anisotropy for polarization and a quarter wave plate will be described later.

Figure 11:
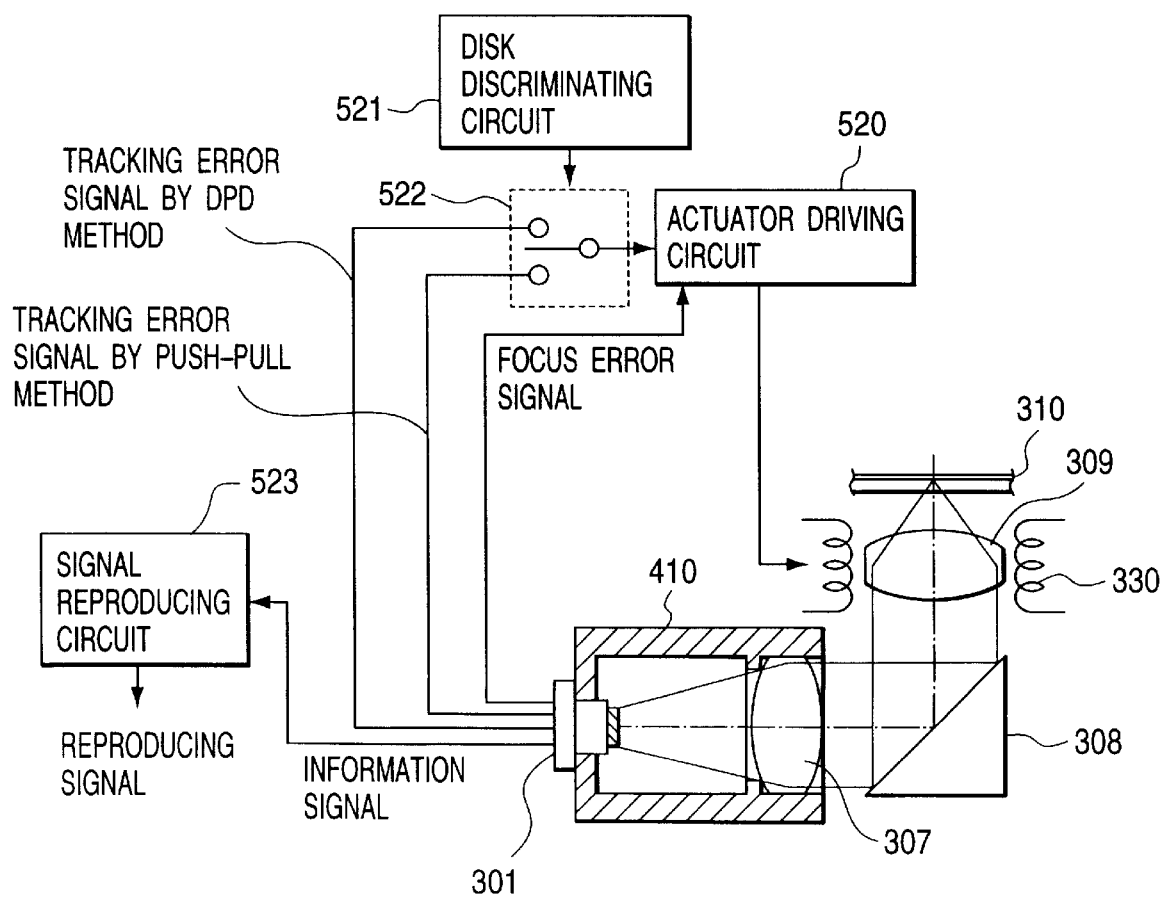
FIG. 11 is a block diagram showing an entire configuration of the third embodiment of the optical pickup of the present invention.

FIG. 11 is a block diagram showing the entire configuration of the third embodiment of the optical pickup of the present invention.

In this embodiment, there will be described an optical disc device into which the optical head module described in the embodiment shown in FIGS. 7 and 8 and FIGS. 9(a) to 9(c) is assembled. A light beam emitted from an optical head module 301 is converted into a parallel beam through a collimator lens 307, and is condensed on a recording plane of an optical disc 310 through a mirror 308 and an objective lens 309. The light beam reflected from the optical disc 310 passes through the objective lens 309, mirror 308, and collimator lens 307 again, and is returned to the optical head module 301. Thus, a focus error signal, two kinds of tracking error signals, and an information signal are detected on the above-described detection principle. In the example shown in FIG. 11, the optical head module 301 and the collimator lens 307 are fixedly contained in the same holder 410. They may be of course fixed on different holders or directly mounted on a chassis of the optical pickup. However, in the arrangement shown in FIG. 11, in which the optical head module 301 and the collimator lens 307 are assembled in the same holder separated from the optical pickup, the adjustment of a light beam into a parallel beam can be made for the single holder before the holder is assembled in the optical pickup. This is very effective to assemble the optical pickup. In addition, the collimator lens 307 can be omitted if the objective 309 is of a so-called finite lens system; and optical parts such as a beam shape prism may be disposed between the collimator lens 307 and the mirror 308.

Of signals detected by the optical head module 301, a focus error signal is directly inputted in a lens actuator drive circuit 520; however, two kinds of tracking error signals are first inputted in a switching circuit 522 connected to a disc discriminating circuit 521, and then a tracking error signal selected as suitable for the reproduced optical disc is inputted in the lens actuator drive circuit 520. A lens actuator drive signal is outputted on the basis of the focus error signal and the tracking error signal inputted in the lens actuator drive circuit 520, and the objective lens 309 is two-dimensionally displaced by driving a two-dimensional lens actuator 330. On the other hand, the information signal detected by the optical head module 301 is supplied to a signal reproducing circuit 523, to reproduce the information signal recorded in the optical disc 310.

In optical discs generally used at present, not only the most suitable tracking error signal detecting method may differ depending on the structure of the disc; but also the most suitable objective lens may differ depending on a difference in substrate thickness, and the most suitable wavelength of a light beam may differ depending on a difference in recording medium. To cope with the former case, for example, there may be provided a plurality of objective lenses corresponding to various thicknesses of the disc substrates and a mechanism for suitably switching the objective lenses, wherein the difference in optical disk is discriminated by the disk discriminating circuit 521 and the tracking error signal detecting method and the objective lens most suitable for the discriminated optical disk are selected.

To cope with the latter case, there may be used an optical pickup including two light sources different in wavelength (which will be described in the following embodiment), wherein the light source most suitable for the kind of the optical disc is selected.

Figure 12:
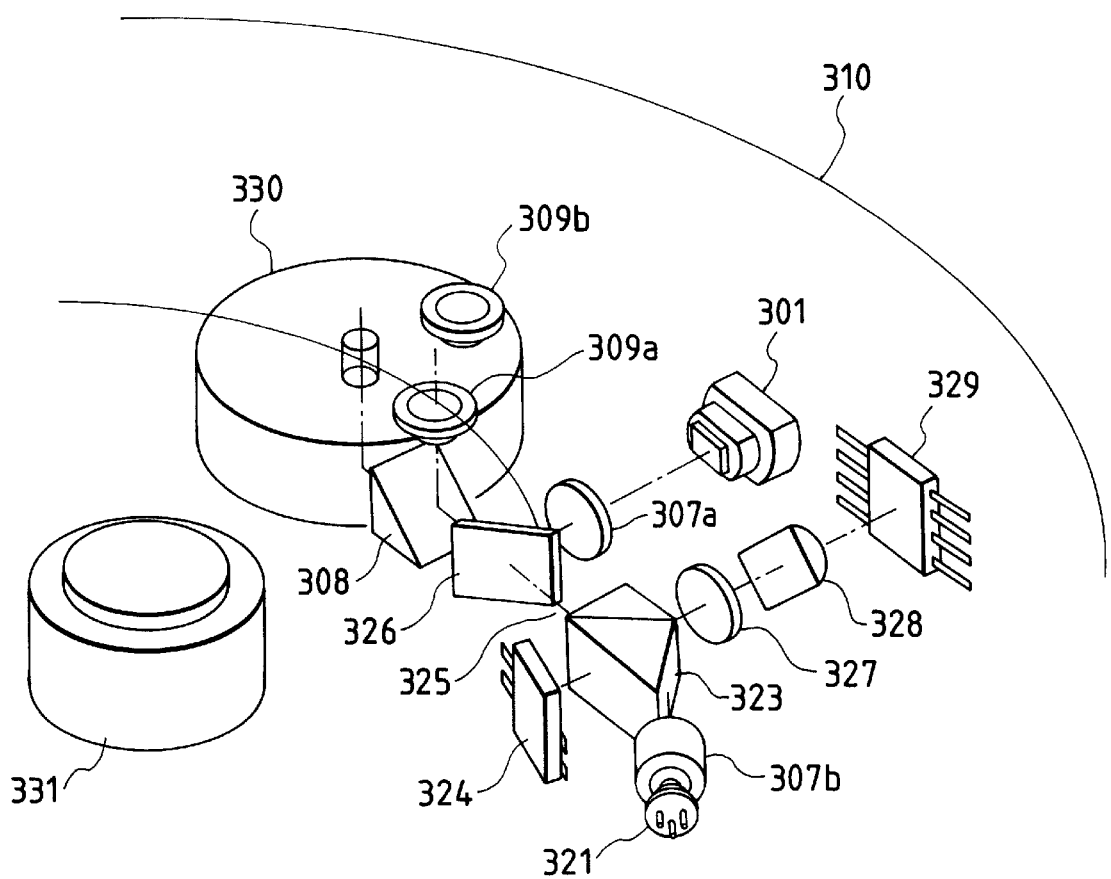
FIG. 12 is a schematic perspective view showing a fourth embodiment of the optical pickup of the present invention.

FIG. 12 is a schematic perspective view of a fourth embodiment of an optical pickup of the present invention.

An optical disc device in this embodiment includes, in addition to the above-described optical head module, a set of a laser diode and a detecting optical system, and two objective lenses having different functions.

A light beam having a wavelength $\lambda 1$ emitted from an optical head module 301 enters in a dichromatic mirror 326 through a collimator lens 307a. Besides, a light beam having a wavelength $\lambda 2$ different from the wavelength $\lambda 1$ emitted from a laser diode 321 is converted into a parallel light beam through a collimator lens 307 and the converted light beam enters in a composite prism 323. The composite prism 323 is an optical element having functions of a beam shape prism and a polarized beam splitter. First, the composite prism 323 enlarges an incoming light beam in one direction by refraction at an incident plane and thus shapes the light beam. Next, the composite prism 323 causes part of the light beam to be separated by reflection at a polarized beam splitter plane tilted about 45° with respect to the optical axis and to enter in a photo-detector 324 for monitoring a laser emission power, and causes the remainder of the light beam to pass therethrough and to enter in the dichromatic mirror 326. The dichromatic mirror 326 has an optical property allowing the light beam having the wavelength λ1 to be reflected therefrom and the light beam having the wavelength λ2 to pass therethrough. That is, about 100% of the light beam emitted from the optical head module 301 is reflected from the dichromatic mirror 326, and about 100% of the light beam emitted from the laser diode 321 and reaching the dichromatic mirror 326 through the composite prism 323 passes through the dichromatic mirror 326. Then, each of the light beams passes substantially through the same optical path, and enters in an objective lens 309a or 309b through a mirror 308 and a quarter wave plate (not shown). These objective lenses 309a and 309b are mounted on a so-called two lens actuator 330 in order to be matched with optical discs different, for example, in optimum wavelength and substrate thickness. The objective lenses 309a and 309b are selected on the basis of a substrate thickness of the optical disc 310 and a difference in wavelength between the laser diodes 301 and 321, and one of the objective lenses 309a and 309b suitable for the optical disc and the light beam is disposed in the optical path. Each light beam passing through the objective lens 309a or 309b enters in the optical disc 310 mounted on a spindle motor 331. The light beam is reflected from the optical disc 310, being returned along the same optical path as that for the going light beam, and then reaches the dichromatic mirror 326 again. The light beam having the wavelength λ1 is reflected from the dichromatic mirror 326, passing through the collimate lens 307a, and is returned to the optical head module 301. As a result, each error signal and an information signal are detected in accordance with the principle described in the third embodiment shown in FIGS. 7, 8 and FIGS. 9(a) to 9(c). On the other hand, the light beam having the wavelength λ2 reflected from the optical disc passes through the dichromatic mirror 326, entering in the composite prism 323 again and being reflected from the polarized beam splitter plane, and reaches a detection lens 327. The light beam passes through the detection lens 327 and enters in a photo-detector 329 through a cylindrical lens 328. The photo-detector 329 detects error signals in accordance with the known detection methods, for example, a focus error signal in accordance with the astigmatism method and a tracking error signal in accordance with the push-pull method; and a recording information signal. It is to be noted that the detecting means for the light beam having the wavelength λ2 is the known technique, and therefore, the detailed explanation is omitted.

In addition, there may be considered an optical pickup of a type mounting two (or more) of optical head modules by replacing the combination of the laser diode emitting the light beam having the wavelength λ2 and its detection system with an optical head module in the two laser diode type optical pick up, for example, shown in FIG. 12.

Figure 13:
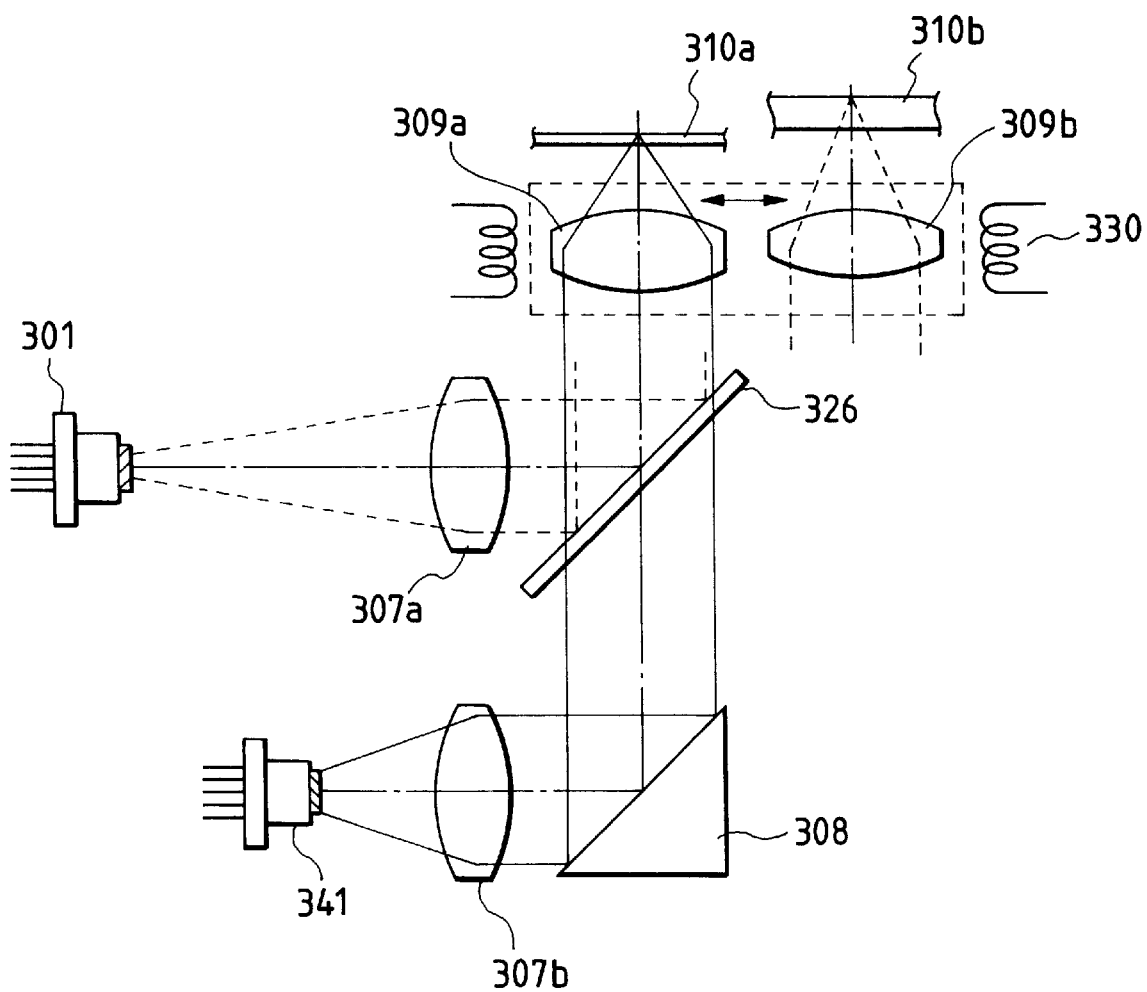
FIG. 13 is a schematic front view showing an essential portion of a fifth embodiment of the optical pickup of the present invention.

Such a two module type optical pick up is shown in FIG. 13.

FIG. 13 is a schematic front view showing an essential portion of a fifth embodiment of the optical pickup of the present invention. In this embodiment, optical parts corresponding to those described in the fourth embodiment shown in FIG. 12 are indicated by the same reference numerals.

Referring to FIG. 13, an optical head module 341 in this embodiment is configured that the laser diode 321 and the photo-detector 329 in the fourth embodiment shown in FIG. 12 are contained in one package similarly to the third embodiment shown in FIGS. 7 and 8. In this way, for an optical pickup having a plurality of light sources, it is possible to omit optical parts such as a detection lens and a beam splitter by replacing each light source and its optical parts with an optical head module of the present invention, and hence to simplify and miniaturize the optical pickup.

Incidentally, the related art push-pull method has a serious problem that there occurs a large offset in a detected tracking error signal depending on displacement of an objective lens in the radial direction of an optical disc. As an optical means effective to cope with such a problem, there may be considered a configuration in which a holographic element is disposed in proximity to an objective lens and is driven together with the objective lens, whereby at least two light components divided from a light beam reflected from an optical disc are allowed to enter in different light detection areas. With this configuration, the position of division lines of the holographic element for dividing the light beam reflected from an optical disc into two the light components relative to the light beam is not varied even if the objective lens is displaced, and accordingly, there occurs little offset in the case of detecting a tracking error signal in accordance with the push-pull method. Such an optical means can be applied to the optical pickup of the present invention. Specifically, the offset of a tracking error signal depending on displacement of an objective lens can be desirably reduced by disposing the four-division type holographic element 304 described in the third embodiment shown in FIGS. 7 and 8 directly under the objective lens and driving the holographic element 304 together with the objective lens.

Figure 14:
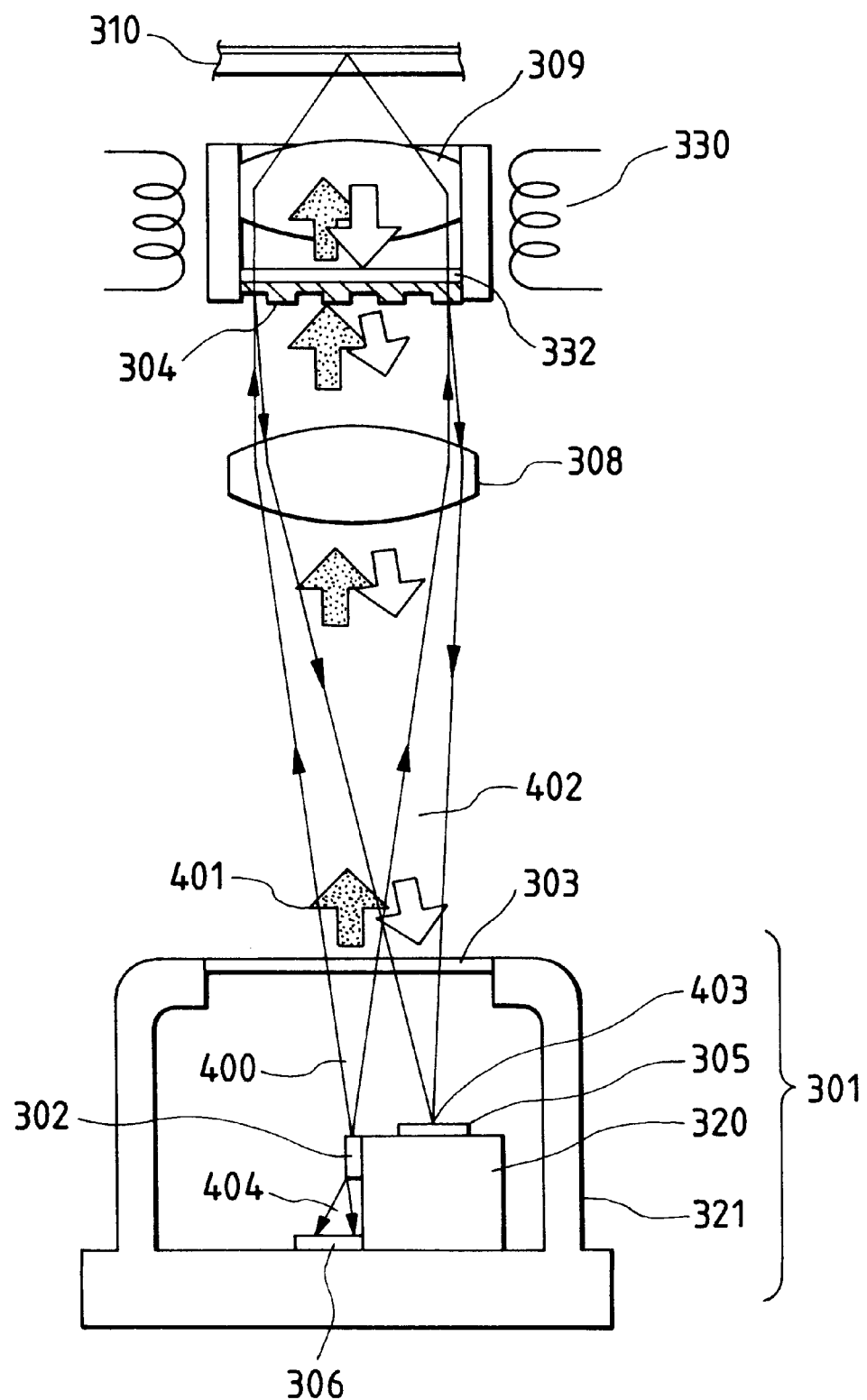
FIG. 14 is a schematic front view showing an essential portion of a sixth embodiment of the optical pickup of the present invention.

FIG. 14 is a schematic front view showing an essential portion of a sixth embodiment of the optical pickup of the present invention.

The sixth embodiment shown in FIG. 14 is intended to reduce an offset of a tracking error signal accompanied by displacement of an objective lens by driving a holographic element together with the objective lens. In this embodiment, optical parts corresponding to those described in the previous embodiments are indicated by the same reference numerals. This embodiment is similar to the third embodiment shown in FIGS. 7 and 8 in that a laser diode 302, a multi-division type photo-detector 305, a photo-detector 306 for monitoring light output are sealed in the same package 321 to constitute an optical head module 301, but is different from the third embodiment shown in FIGS. 7 and 8 in that a four-division type holographic element 304 is not provided in a window area 303 but is disposed in the vicinity of an objective lens 309. Further, in this embodiment, the holographic element 304 is made from an optical material having an anisotropy for polarization (for example, crystal of lithium niogate) and a quarter wave plate 332 is disposed between the holographic element 304 and the objective lens 309, so that a going light beam, which is emitted from the laser diode 302 and enters in an optical disc 310 through the collimator lens 308 and the objective lens 309, little generates diffracted light while a returning light beams, having a direction of polarization perpendicular to that of the going light beam, generates diffracted light at a specific diffraction efficiency. With this configuration, it becomes possible to obtain a good light availability and to significantly suppress generation of stray light exerting adverse effect on recording or reproducing performance of a signal in an optical pickup.

In this embodiment, the holographic element 304 and the quarter wave plate 332 are fixed, together with the objective lens 309, on one holder, and are driven by a lens actuator 330 together with the objective lens 309. With this configuration, as described above, the position of division lines of the holographic element 304 relative to a light beam reflected from an optical disc can be fixed irrespective of displacement of the objective lens 309, as a result of which even if the objective lens 309 is displaced in the radial direction of the optical disc 309, a tracking error signal in accordance with the push-pull method can be detected by the photo-detector 305 usually in a good signal state with little generation of offset.

As described above, the present invention can provide an optical pickup including tracking error signal detectors capable of detecting tracking error signals in accordance with the push-pull method and the DPD method, wherein these tracking error signal detectors are switched in matching with kinds of optical discs used, and an optical disc device using the optical pickup.

The present invention also can provide an optical pickup exhibiting a good light availability by combination of a diffraction grating formed of a member having an anisotropy for polarization and a quarter wave plate, and an optical disc device using the optical pickup.

The present invention also can provide an optical pickup capable of adjusting a focal length and enhancing a light availability by using a holographic element having curved grating grooves as a diffraction grating, and an optical disc device using the optical pickup.

While we have shown and described several embodiments in accordance with the present invention, it is understood that the same is not limited thereto but is susceptible of numerous changes and modifications as known to these skilled in the art, we therefore do not wish to be limited to the details shown and described herein but intend to cover all such changes and modifications as are encompassed by the scope of the appended claims.

What is claimed is:

1. An optical pickup comprising:
    a light source for emitting a light beam;
    an objective lens for condensing said light beam emitted from said light source, and irradiating said light beam on an optical storage medium;
    a photo-detector having a plurality of independent detection areas, including first and second detection areas whose boundaries are in close proximity to each other; third and fourth detection areas whose boundaries are in close proximity to each other; a fifth detection area independent from said first to fourth areas; a sixth detection area independent from said first to fifth areas; a seventh detection area independent from said first to sixth areas; and an eighth detection area independent from said first to seventh detection areas;
    a diffraction grating provided in an optical path between said objective lens and said photo-detector, said diffraction grating having a region which is divided by substantially perpendicular division lines, into four diffraction areas which diffract said light beam in different directions; wherein
    one of a +1st order diffracted light beam and a −1st order diffracted light beam obtained respectively from each of two of said areas of said diffraction grating is irradiated at each of a boundary portion between said first and second detection areas and a boundary portion between said third and fourth detection areas; and
    another one of the +1st order diffracted light beam and the −1st order diffracted light beam obtained from all of said diffraction areas of said diffraction grating are irradiated on each of said fifth, sixth, seventh, and eighth detection areas;
    whereby light intensities of said light beams are independently detected by said detection areas of said photo-detector.

2. An optical pickup according to claim 1, further comprising:
    a focus error signal detector for arithmetically operating detection signals obtained from said first to fourth detection areas of said photo-detector and obtaining a focus error signal;
    a first tracking error detector for arithmetically operating detection signals obtained from said fifth to eighth detection areas of said photo-detector and obtaining a tracking error signal in accordance with a push-pull method; and
    a second tracking error detector for arithmetically operating a phase difference between detection signals obtained from said fifth to eighth detection areas of said photo-detector and obtaining a tracking error signal in accordance with a differential phase detection method.

3. An optical disc device using said optical pickup according to claim 2, further comprising:
    a disc discriminating circuit for detecting a difference between said optical storage media and outputting a discrimination signal;
    wherein said first and second tracking error signal detectors are switched on the basis of the discrimination signal supplied from said disc discriminating circuit.

4. An optical pickup according to claim 1, wherein respective directions and angles of diffraction of said light beam are determined by a grating direction and a grating pitch of said diffraction grating.

5. An optical pickup comprising:
    a laser diode for emitting a light beam;
    an objective lens for condensing said light beam emitted from said light source, and irradiating said light beam on an optical storage medium;
    a photo-detector having a plurality of independent detection areas, including first and second detection areas whose boundaries are in close proximity to each other; third and fourth detection areas whose boundaries are in close proximity to each other; a fifth detection area independent from said first to fourth areas; and a sixth detection area independent from said first to fifth areas; and
    a diffraction grating provided in an optical path between said objective lens and said photo-detector, said diffraction grating having a region which is divided by substantially perpendicular division lines, into four diffraction areas which diffract said light beam in different directions, a first diffraction area of said diffraction grating irradiating said light beam at the boundaries in close proximity between said first and second detection areas of said photo-detector, a second diffraction area of said diffraction grating irradiating said light beam at the boundaries in close proximity between said third and fourth detection areas of said photo-detector, and third and fourth diffraction areas of aid diffraction grating irradiating said light beam on said fifth and sixth detection areas of said photo-detection areas of said photo-detector, respectively; and
    a distance between a boundary line between said first and second detection areas and a boundary line between said third and fourth detection areas has a magnitude that compensate for changes in positions of convergent light beams impinging on said boundary lines when a wavelength of a laser beam of said laser diode is varied depending on temperature change, and thereby an angle of diffraction is varied;

whereby light intensities of said light beams are independently detected by said detection areas of said photo-detector, without effect of a temperature change.

6. An optical pickup comprising:

a light source for emitting a light beam;

an objective lens for condensing said light beam emitted from said light source, and irradiating said light beam on an optical storage medium;

a photo-detector having a plurality of independent detection areas, including first and second detection areas whose boundaries are in close proximity to each other; third and fourth detection areas whose boundaries are in close proximity to each other; a fifth detection area independent from said first to fourth areas; and a sixth detection area independent from said first to fifth areas; and a diffraction grating provided in an optical path between said objective lens and said photo-detector, said diffraction grating having a region which is divided by substantially perpendicular division lines, into four diffraction areas which diffract said light beam in different directions, a first diffraction area of said diffraction grating irradiating said light beam at the boundaries in close proximity between said first and second detection areas of said photo-detector, a second diffraction area of said diffraction grating irradiating said light beam at the boundaries in close proximity between said third and fourth detection areas of said photo-detector, and third and fourth diffraction areas of said diffraction grating irradiating said light beam on said fifth and sixth detection areas of said photo-detection areas of said photo-detector, respectively;

wherein said diffraction grating has projections and recesses, and a difference in optical path length between said projections and said recesses substantially corresponds to an odd number multiple of a half-wavelength of a light beam;

whereby light intensities of said light beams being independently detected by said detection areas of said photo-detectors.

* * * * *